United States Patent [19]
Dillier

[11] Patent Number: 5,637,216
[45] Date of Patent: Jun. 10, 1997

[54] FILTER MATTING FOR A REVERSIBLE-FLOW FILTER

[75] Inventor: Gustav Dillier, Magden, Switzerland

[73] Assignee: Rosenmund AG, a Swiss corporation, Switzerland

[21] Appl. No.: 637,583

[22] Filed: Apr. 25, 1996

Related U.S. Application Data

[63] Continuation of Ser. No. 70,353, filed as PCT/CH92/00198 Oct. 1, 1992, abandoned.

[30] Foreign Application Priority Data

Oct. 4, 1991 [CH] Switzerland .............. 2936/91

[51] Int. Cl.$^6$ ............................................ B01D 29/05
[52] U.S. Cl. .......................... 210/335; 210/344; 210/345; 210/490; 210/510.1
[58] Field of Search ............................ 210/185, 330, 210/335, 344, 345, 486, 490, 496, 510.1, 459, 461, 462, 499

[56] References Cited

U.S. PATENT DOCUMENTS

| | | |
|---|---|---|
| 3,780,872 | 12/1973 | Pall ........................... 210/510.1 |
| 3,948,778 | 4/1976 | Muller ......................... 210/345 |
| 4,138,303 | 2/1979 | Taylor, Sr. . | 
| 4,414,172 | 11/1983 | Leason . |
| 4,446,352 | 5/1984 | O'Cheskey et al. . |
| 4,889,642 | 12/1989 | Kaiser ......................... 210/771 |
| 4,954,268 | 9/1990 | Just et al. ..................... 210/798 |
| 5,069,791 | 12/1991 | Becker et al. ................. 210/344 |

FOREIGN PATENT DOCUMENTS

| | | |
|---|---|---|
| 169698 | 1/1986 | European Pat. Off. . |
| 1194915 | 8/1989 | Japan ......................... 210/490 |
| 218286 | 1/1925 | United Kingdom . |
| 2004762 | 11/1979 | United Kingdom . |

Primary Examiner—Matthew O. Savage
Attorney, Agent, or Firm—Lorusso & Loud

[57] ABSTRACT

A filter mat for use in reverse rinsing filter devices consisting of at least two filter mat devices and one static rigid filter mat base. The filter mat produces evenly distributed reverse rinse channels that provide even distribution of pressure in the filter mat.

1 Claim, 5 Drawing Sheets

FILTER MATTING FOR A REVERSIBLE-FLOW FILTER

This application is a continuation of application Ser. No. 08/070,353, filed as PCT/CH92/00198, Oct. 1, 1992, now abandoned.

BACKGROUND OF THE INVENTION

The invention concerns a metal filter mat for use in reversible-flow filter devices, according to the preamble to patent claim 1.

The pressure filters commonly used in engineering generally contain a changeable filter mat, which is mounted on the base of the filter or on parts of the filter housing. In order to keep the filter mat from getting clogged or to remove filter cakes completely from the filter after the filter process, so-called reverse rinsing is used, i.e., a rinse process with a gas or liquid in the opposite direction from the main flow. The reverse rinse is supposed to extend the life of the filter mat, and when a suction filter is used, it should help meet strict purity specifications and remove the filter cake with no residue. However, the reverse rinse process is time-consuming and does not always produce the success desired. Particularly high demands are made on the strainer for residue-free removal when the sequence of lots involves a change of product, and with sensitive materials, for example in the chemical-pharmaceutical field, there is a danger of cross-contamination.

The known filter mats are multilayer and consist of wire gauze whose mesh size, starting from the mesh width necessary for the respective filter process, becomes increasingly coarse in the flow direction. Due to the multilayer design of the conventional filter mat, a certain static strength is achieved during the pressure filter process.

But with very firmly adhered filter cakes or stubborn residues in the filter mat, during the reverse rinse, some parts are discarded or separated in the reverse rinse direction. This makes not only the mat body unusable. Especially with suction filters, removal elements, for example stirring and peeling arms, are arranged at very short distances over the surface of the filter. If the filter were discarded, the filter cake would have to be peeled off by hand, in order to prevent damage to the removal elements. If the lots of product are sensitive, i.e., must be processed sterile, this ruins the whole lot. The attendant loses are substantial. In order to circumvent the above problem in practice, the filter cake, especially in conventional pressure filters, is removed mostly by the effect of centrifugal forces or with the aid of flyweight motors.

The task of this invention is to make an improvement in filter mats so that better stability is guaranteed, especially during the reverse rinse and, if necessary, the drying process and so that the filter devices can be operated more effectively during production or processing.

SUMMARY OF THE INVENTION

The task that has been set is solved by the invention in the characteristics of patent claim 1.

The decisive advantage of the filter mat design in the invention lies in its extraordinarily high mechanical strength and flexural strength for the filter mat bond, which makes a perfect reverse rinse and dry process possible. In stress tests, this bond proved surprisingly good, as will be shown later on using selected experimental results.

With the filter mat design in the invention, the filter cake is cleaned not only by a displacement wash process, but also in the counter current; and the reverse rinse to clean the filter mats can be done with practically no extra manual intervention. By convection or fluidized drying, i.e., removal of the solid matter from the filter mat by means of a gas current, the filter cake can be dried in a simple way. By building in a filter mat like the one in the invention, a regular filter device can also be used as a combination filter and spin dryer.

Besides the mechanical and flexural strength of the filter mat, an even distribution of pressure of the fluid or gaseous reverse rinse agent over the entire filter mat is of decisive importance in making the reverse rinsing or drying processes run perfectly. Otherwise, this would have to be done by additional manual intervention as in the state of the art. Sintering the individual layers of the filter mat constructed from plastic or metal, to one another, and with a filter mat base made of plastic or metal, produces evenly distributed reverse rinse channels that provide even distribution of pressure in the filter mat.

The plastics for the base or the layers of the filter mat can be thermoplastics, like polyolefins, vinyl polymers, polyamide, polyester, polyacetale [sic], polycarbonate and polyurethane, for example; the metals for the base and layers of the filter mat are primarily steel, wherein the base of the filter mat contains one or more flow holes, depending on its size.

Pressures suitable for the reverse rinse or drying range are, for example, from 0–6 bar, but can also be higher, depending on the need.

The operation of a filter with devices for automatic removal of the filter cake is substantially shortened by the measures in the invention and results in improved product yield, as well as markedly high operating safety. With sensitive products, the shortening of the processing time from 5 hours to 3 hours, for example, means more careful treatment of the products and thus an improvement in quality.

The filter mat designs in the invention have the following properties:
there is no static supercharging
inherently stable
mechanically load-bearing
largely abrasion-free
temperature-resistant from 0° C. to more than 600° C.
can be sterilized
no nap
weldable
can also be produced from high-grade materials.

One special advantage can be shown by the use of the sintered filter mat shape described during the operation of a suction filter. Pressure filters of this type are used to separate out suspensions that can be filtered. The goal of the process is to obtain the filtered liquid or the solid residue or both components. The filter cake deposited on the base of the filter during the process is suspended, spread, dried and removed from the filter container through a discharge valve in successive steps in the process. The housings of such pressure filters are sealed so they are pressure-proof and in special cases have to make sure that the product inside is under sterile conditions.

To dry the filter cake before its removal, a heating device is built into the base of conventional suction filters. Drying the filter cake, which lies compactly on the top layer of the filter mat, takes a substantial part of the whole processing time.

With the use of the sintered filter mat shape described above, which has achieved an extraordinarily high flexural strength through the sintering process, the drying process for the filter cake is speeded up considerably in the suction filter. By reverse rinsing with a heated gas, for example with an inert gas (for sterile processing), or with air, the residual layer of the filter cake can be efficiently ejected from the filter mat, with no danger that the filter mat will be discarded or destroyed. And the rinse agent can flow at a more efficient rate during reverse rinsing. In addition, the residual layer of the filter cake is ejected in small pieces and dissolved as in fluidization, so that the drying process runs in a fraction of the time required in the past. This means more careful treatment of the product.

Details and other advantages of the invention will emerge from the following description of examples of embodiment.

DESCRIPTION OF THE PREFERRED EMBODIMENT

Figure 1:
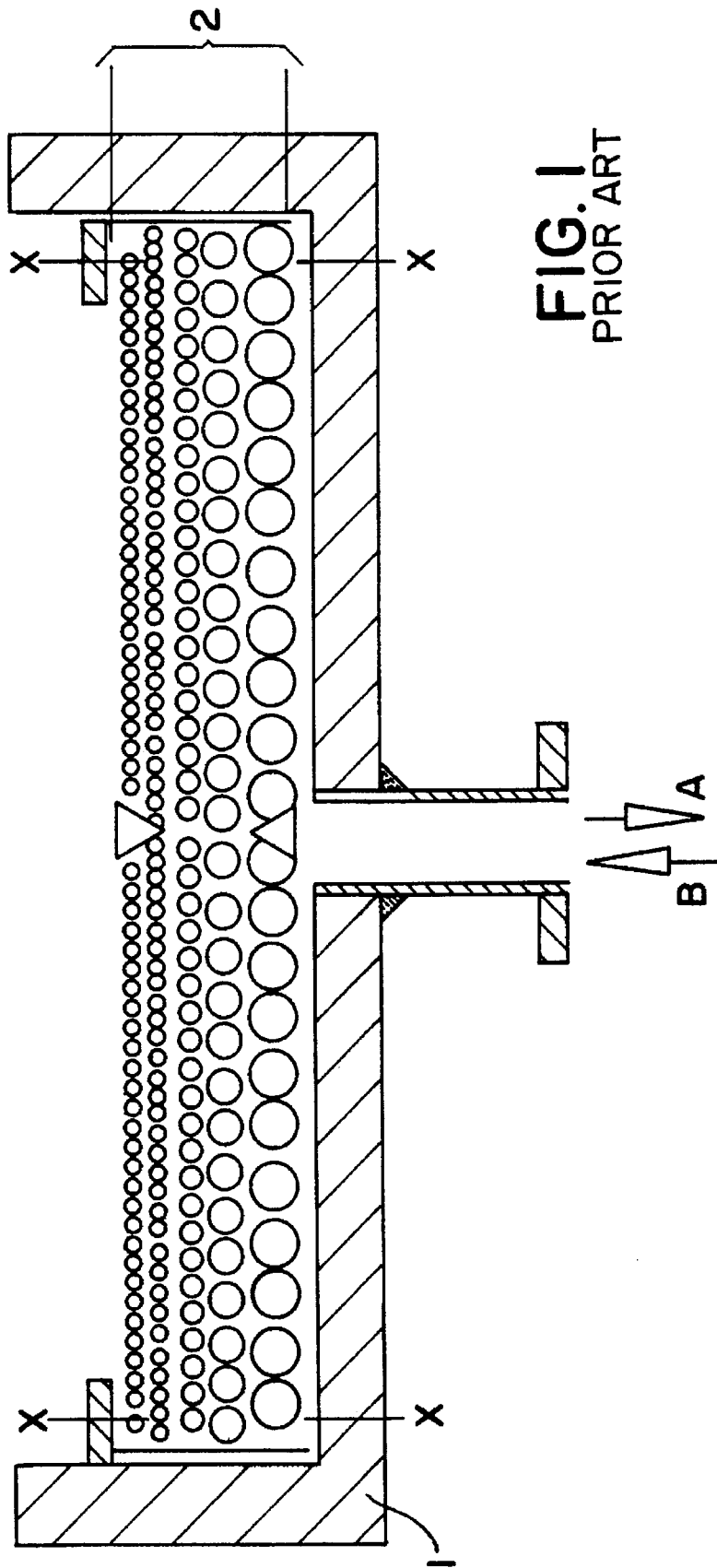
FIG. 1 a cross section through the conventional, non-reverse-rinsing filter structure in a filter housing FIG. 2 a cross section through a filter structure sintered for reinforcement in the same part of the housing, FIG. 3 a partial section through a dual-action reverse-rinsing filter structure FIG. 4 a partial section through a dual-action filter structure that can be heated and reverse-rinsed.

FIG. 1 shows a conventional filter structure in the form of a suction filter. On the base of a filter housing 1, there is a multilayer filter mat 2. The upper, fine-mesh part is supported by the lower middle part, with mesh widths for the mats increasing as the filter goes in the flow direction A. With reverse rinsing in direction B, the upper mats, which are partially clogged, serve to brake the flow: the filter shape is "blown up" and torn from its anchor X—X, which causes destruction of the filter mat.

Figure 2:
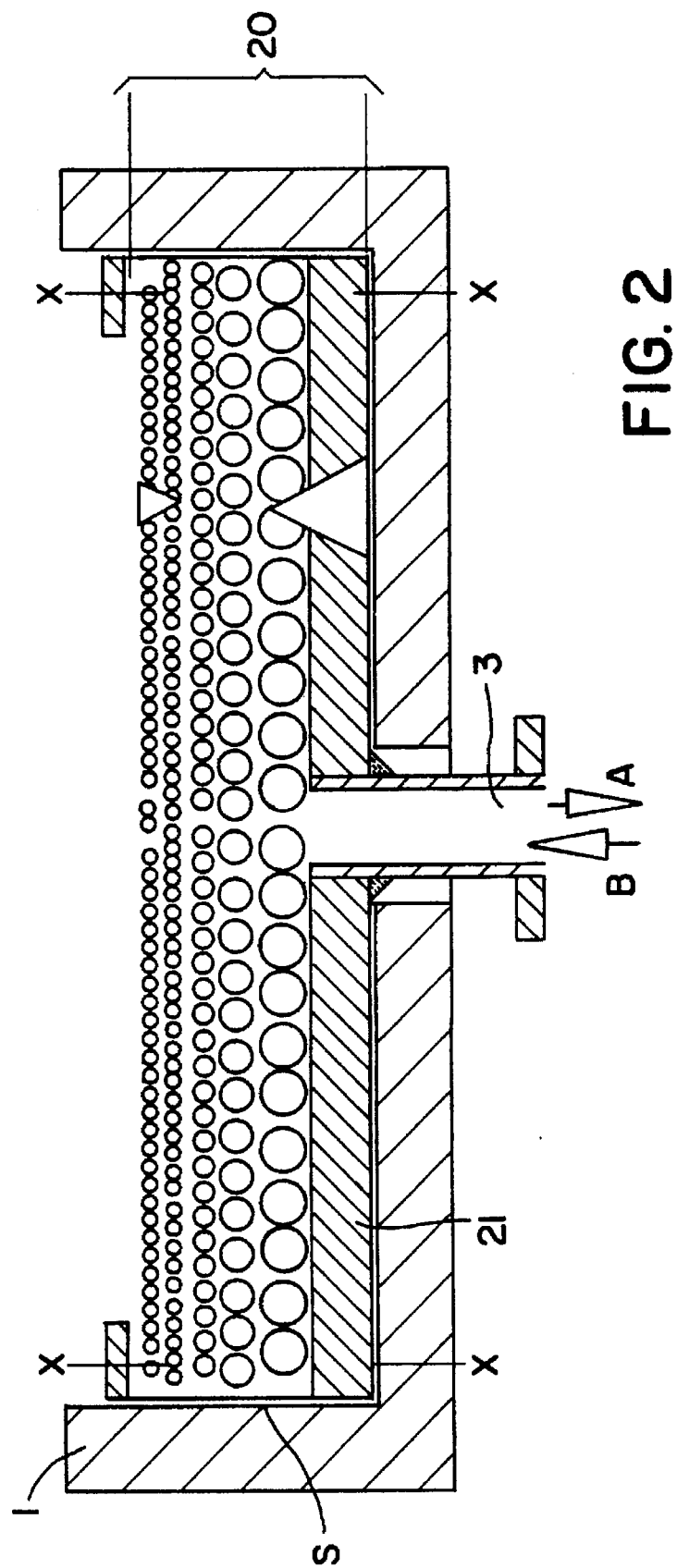

In the example in FIG. 2, on the other hand, the layers of the filter mat 20, which were made from metal, were connected one under the other, as well as to one another by a sintering process with a filter mat base 21 made of metal. In an alternate embodiment, the filter mat layers 20 are constructed from plastic. First the filter mats are layered one on top of the other with increasing mesh widths and closed off on the side of the largest mesh width by the base 21 of the filter mat. The whole packet now goes through a sintering process; in the first step of the process, the layers of the filter mat are sintered one under the other; then in a second step, they can be sintered or pressed with the base of the filter mat. The last step uses a filter mat base made of plastic and is practically unavoidable due to the different high melting temperatures of metals and plastics.

When a filter mat base made of metal is used, the packet can be put into a sintering oven according to a sintering process known in and of itself, and the temperature can be set so it its consistent with the material used for the filter mat and/or the material for the base of the filter mat. The packet is also subjected to compressive force. Under the influence of the relatively high temperature of the process, which is close to the melting temperature of the material of the filter mat or the base of the filter mat, as well as additional pressure at work, parts of the filter mat lying one on top of the other are connected to one another by an interfacial reaction. The connections at the points of contact where the heated layers are pressed together are made by atomic bonding due to plastic deformation at these points.

As a result, a mechanical bond of extraordinarily high mechanical stability and flexural strength is formed, comparable to a static three-dimensional framework, with a connecting pore skeleton. This bond proved to be surprisingly good in stress tests, as will be shown later using selected experimental results. There is no longer any need to fear finer filter mat layers detaching with this sintered shape.

The filter mat (20) can also be welded, glued, pressed or connected in another way instead of sintering to increase its stability, or the different production processes can be combined.

The form of the base 21 of the filter mat can be adapted to practically any type of application desired. It can be round or square. In the example in FIG. 2, the filter mat base 21 has a flow hole 3, which serves as an outlet and as a reverse rinse inlet. Because of the uniform pore skeleton in and between the layers of the filter mat, in this case, there is sufficiently even distribution of the pressure from the rinse agent on the critical upper mat area during reverse rinsing. Filter mat shapes with especially large surfaces 20 may need more holes made in the base of the filter mat 21.

As the example in FIG. 2 also shows, the sintered filter mat shapes 20 can be welded together, so that surfaces practically as large as desired can be covered. The shapes are welded on the edges of the filter mat S, in order to make sure there is sufficiently even pressure distribution by cross flow in the filter body.

Figure 3:
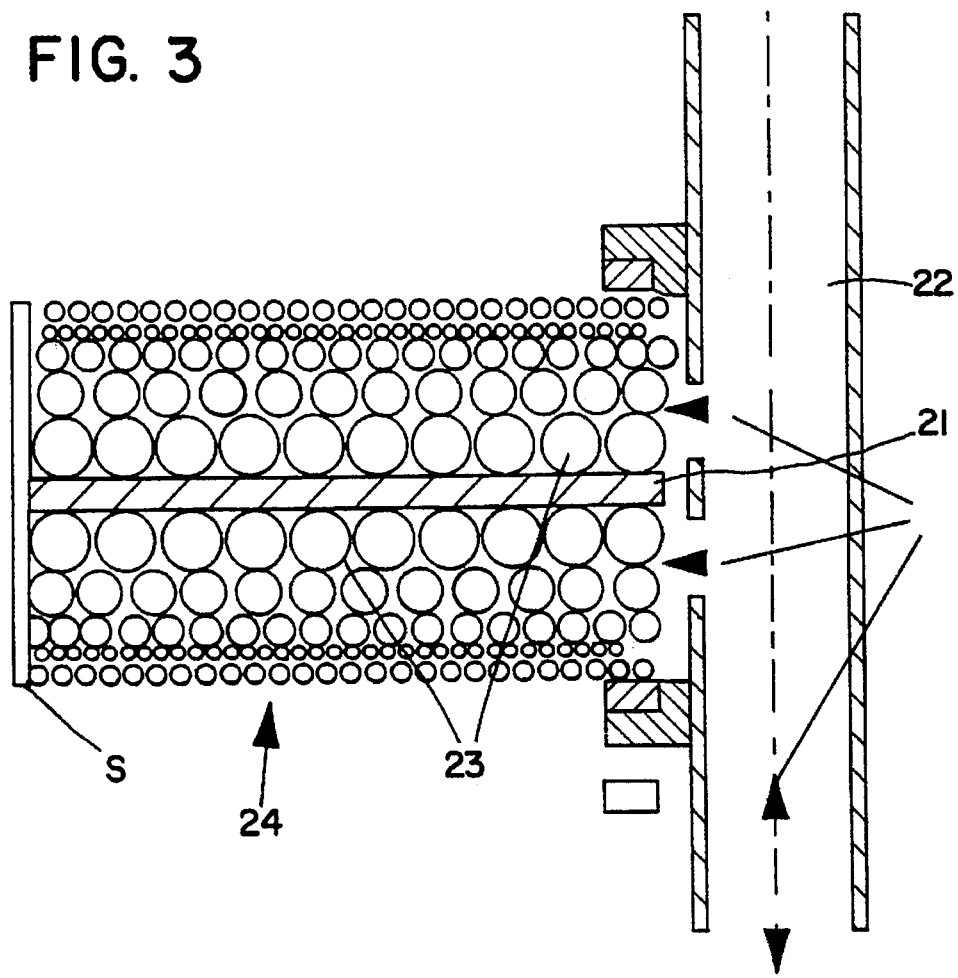
Figure 4:
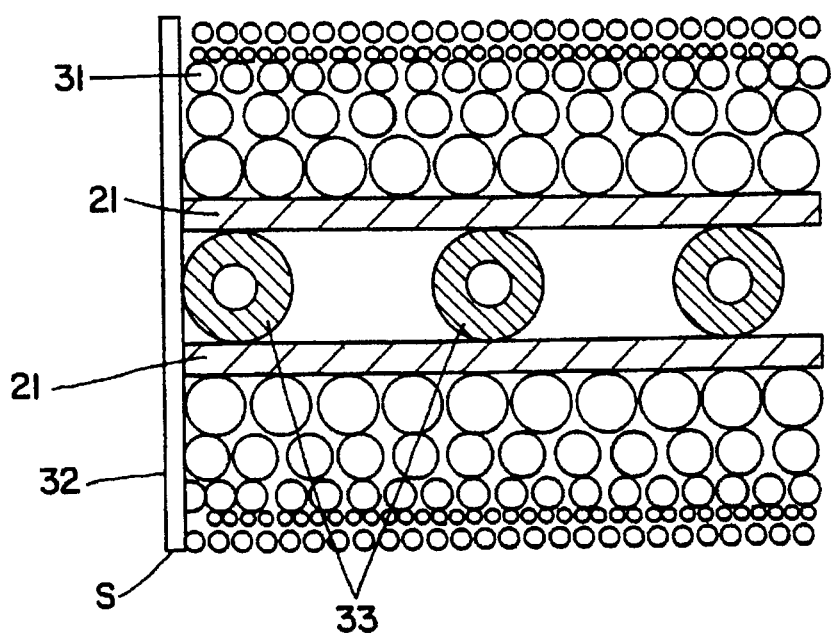

FIGS. 3 to 4 show other selected examples of application of the sintered filter mats 20 with the filter mat base 21 for multilayer filters.

According to FIG. 3, there is a lateral connection to the flow channels 22, wherein a plate-shaped round pair of filter mats 23, which has only one filter mat base 21 around a centrally arranged flow channel 22, on which the pair of filter mats 23 is sintered each with the coarse-mesh side. On the outer edges S of the pair of filter mats 23, the filter mat body 24 is sealed to the flow. But it can also be connected to the outer edges on the flow channels 22. This is primarily true when the filter mat body 24 is not round, but square, for example. In this example, the filter mat base 21 is designed as a closed flow channel wall.

By applying pressure, the suspension put in the pressure filter is separated into the solid and the filtrate, and the filtrate is removed through the flow channels 22. Now, the solid can be purified in the cross-current process with a liquid rinsing agent, which goes to the solid through the flow channels 22 via the pair of filter mats 23, and is then lifted off, dried and removed from the pair of filter mats 23 with a gas current, for example with nitrogen as the gas.

FIG. 4 shows a filter arrangement that can be heated. Two filter mats 31 and 32, each of which has a filter mat base 21, sit on heating devices, for example heating tubes 33 with the filter mat base 21. The heat is used to dry the filter cake before it is removed. Substantially better heat transfers and thus shorter drying times can be achieved with this shape. This means more careful handling of the product.

Figure 5:
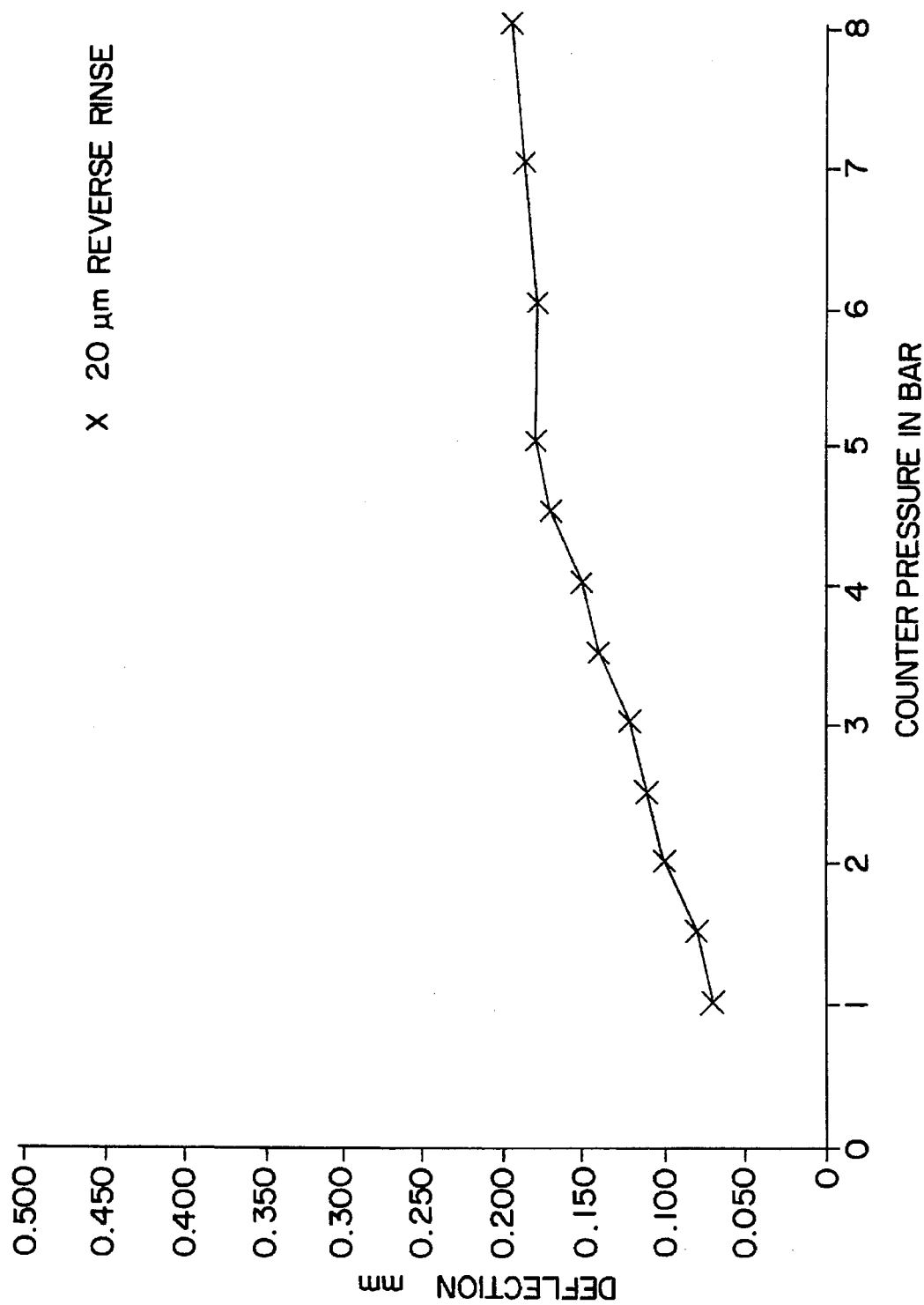
FIG. 5 the result of a measurement sequence for the flexion of a sintered filter structure, depending on the counterpressure, and FIG. 6 the flow capacity, depending on the counterpressure, for the result in FIG. 5.
Figure 6:
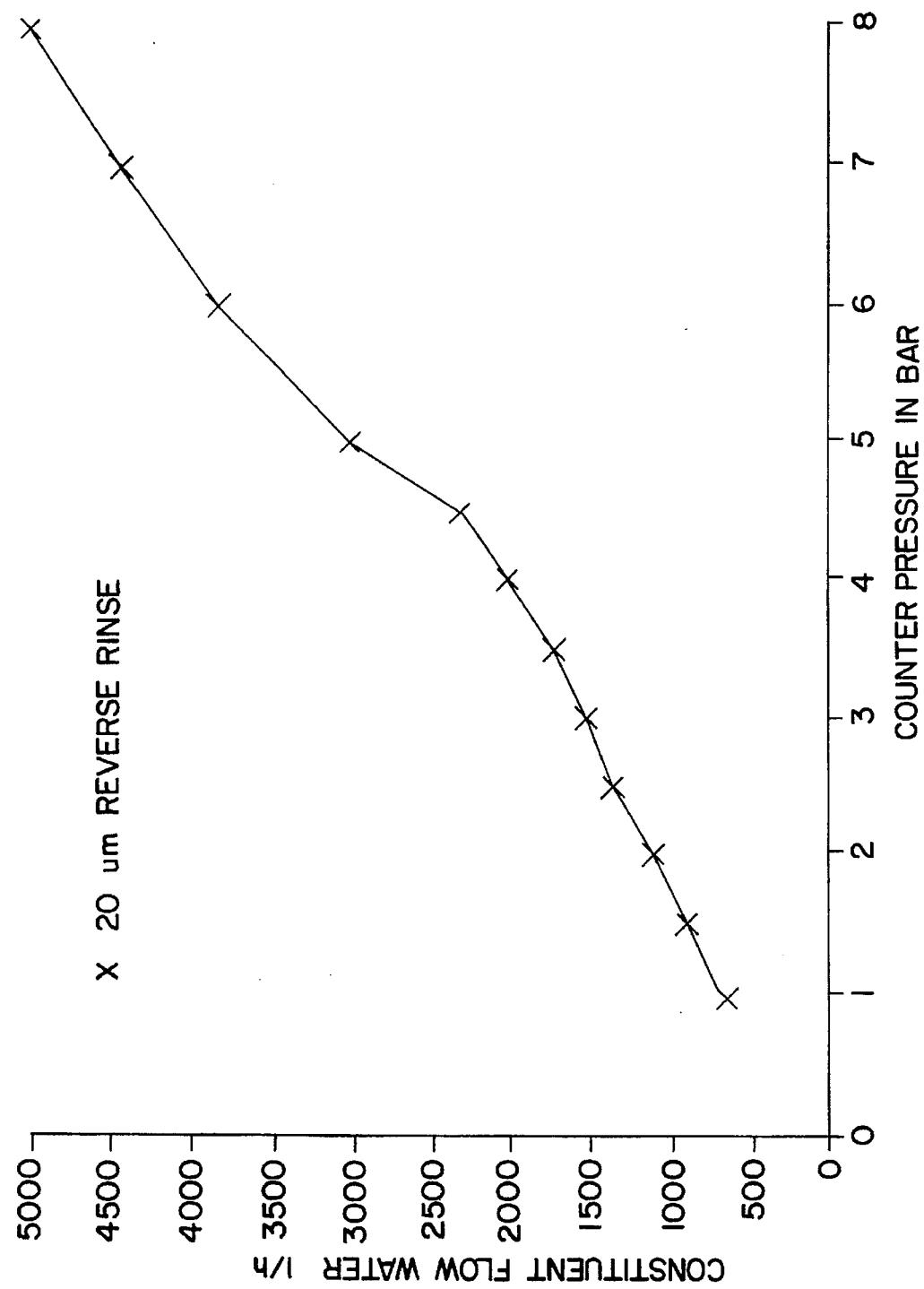

FIG. 5 shows the result of a measurement sequence for deflection of a sintered filter mat shape 20 with 20 μm finest mesh width, depending on the counter pressure. The advantageous limitation of the deflection with increasing counter pressure during reverse rinsing is easy to see. FIG. 6 shows flow capacity depending on counter pressure as a practically straight rising curve.

Basically, the rigid shape of the filter mat 20 with its filter mat base 21 can be used to advantage in the following areas:

Solid/liquid separators like filters, centrifuges, strainers, etc.

Fluidization systems, like fluidized beds, fixed beds, gas absorption devices, conveyor devices, built-in silo systems (ventilation), fermenting systems for gas absorption, etc.

Solid/gas separators, like dust filters (cement separation), exhaust vapor filters in drying systems.

Solid/solid separators like classifiers, sieves, etc.

Liquid/liquid separators, like microfiltration, cross-current filtration, etc.

What is claimed is:

1. A reverse-rinsing filtration system, comprising;

conduit means for defining an axial flow channel;

at least two filter mat devices, each of said filter mat devices being comprised of a plurality of generally planar filter mesh layers, each of said filter mat devices having a first peripheral edge surrounding a second peripheral edge, an upstream side, and a downstream side;

at least one imperforate static rigid filter mat base interposed between each pair of said at least two filter mat devices, said filter mat base being generally planar and having a first peripheral edge surrounding a second peripheral edge and a pair of opposed sides, wherein the first peripheral edges of said filter mesh layers and the first peripheral edges of said filter mat base are disposed adjacent said conduit means, and wherein the downstream side of one of said filter mat devices abuts one side of said filter mat base and the downstream side of another filter mat device abuts the other side of said filter mat base;

means for fluidly connecting the first peripheral edges of said filter mesh layers to the axial flow channel of said conduit means, sealing means disposed on the second peripheral edges of said filter mesh layers and of said filter mat base whereby said filter mat base and the sealed second peripheral edges together define a closed current channel wall;

wherein said filter mesh layers are arranged with decreasing mesh width in a direction axially outward from said filter mat base; and wherein said filter mesh layers are interfacially bonded to each other by sintered connections, and wherein the downstream sides of said filter mat devices are bonded to the respective sides of said filter mat base by sintered connections.

* * * * *